US012693273B2

(12) United States Patent
Burnett et al.

(10) Patent No.: US 12,693,273 B2
(45) Date of Patent: *Jul. 28, 2026

---

(54) NEEDLE DRIVE, SYSTEM AND METHOD

(71) Applicant: Waters Technologies Corporation, Milford, MA (US)

(72) Inventors: Joshua A. Burnett, Taunton, MA (US); Rose Solow, Newark, NJ (US); David A. Simpson, Hopkinton, MA (US); Marc E. Lemelin, Douglas, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,786

(22) Filed: Feb. 26, 2024

(65) Prior Publication Data

US 2024/0201142 A1 Jun. 20, 2024

Related U.S. Application Data

(63) Continuation of application No. 17/203,127, filed on Mar. 16, 2021, now Pat. No. 11,913,916.

(Continued)

(51) Int. Cl.
*G01N 30/16* (2006.01)
*G01N 35/10* (2006.01)

(52) U.S. Cl.
CPC ......... *G01N 30/16* (2013.01); *G01N 35/1079* (2013.01); *G01N 35/1095* (2013.01); *G01N 2035/1027* (2013.01)

(58) Field of Classification Search
CPC . G01N 30/16; G01N 35/1079; G01N 35/1095

(Continued)

(56) References Cited

U.S. PATENT DOCUMENTS 3,918,913 A 11/1975 Stevenson et al.
4,268,477 A 5/1981 Herzstark
(Continued)

FOREIGN PATENT DOCUMENTS

CN 205176047 U 4/2016
CN 107430103 A 12/2017
(Continued)

OTHER PUBLICATIONS

Observation by third party in European Patent Application No. 21720036.9 filed on Sep. 1, 2023.
(Continued)

*Primary Examiner* — Peter J Macchiarolo
*Assistant Examiner* — Rodney T Frank
(74) *Attorney, Agent, or Firm* — Schmeiser Olsen, PLLC; Victor J. Baranowski, Esq.

(57) ABSTRACT

A liquid chromatography sample manager includes a thermal chamber, a sample platter mounted in the thermal chamber, and a needle drive including a base having a shaft configured to rotate about a vertical axis, the base attachable to an interior of a sample manager of a liquid chromatography system. The needle drive further includes a needle assembly attached to the base, the needle assembly including a sample needle, and a drive system attached to the base, the drive system including a sample needle motor configured to impart vertical movement of the sample needle. The liquid chromatography sample manager further includes a sample delivery system configured to transfer a first sample from a first sample vial carrier located in the sample platter into a chromatographic flow stream.

20 Claims, 10 Drawing Sheets

Related U.S. Application Data

(60) Provisional application No. 62/990,653, filed on Mar. 17, 2020.

(58) Field of Classification Search
USPC ......................................................... 73/61.55
See application file for complete search history.

(56) References Cited

U.S. PATENT DOCUMENTS

| | | | |
|---|---|---|---|
| 4,713,974 | A | 12/1987 | Stone |
| 4,951,513 | A | 8/1990 | Koike |
| 5,005,434 | A | 4/1991 | Watanabe et al. |
| 5,352,612 | A | 10/1994 | Huber et al. |
| 5,482,207 | A | 1/1996 | Nelson et al. |
| 5,531,323 | A | 7/1996 | Kelson et al. |
| 5,660,727 | A | 8/1997 | Gleave et al. |
| 5,814,742 | A | 9/1998 | Vissers et al. |
| 5,993,627 | A | 11/1999 | Anderson et al. |
| 6,148,680 | A | 11/2000 | Baeuerle et al. |
| 6,170,267 | B1 | 1/2001 | Kitaoka |
| 6,745,898 | B2 | 6/2004 | Lin |
| 6,760,679 | B1 | 7/2004 | Carney et al. |
| 6,859,271 | B1 | 2/2005 | Carney et al. |
| 6,909,251 | B2 | 6/2005 | Cooley et al. |
| 6,945,129 | B2 | 9/2005 | Escal |
| 6,973,846 | B2 | 12/2005 | Bremer et al. |
| 7,008,599 | B1 | 3/2006 | Carlton et al. |
| 8,296,962 | B2 | 10/2012 | Ferrara et al. |
| 8,695,444 | B2 | 4/2014 | Hiltbrand |
| 8,776,621 | B2 | 7/2014 | Modic et al. |
| 9,052,304 | B2 | 6/2015 | Kerr |
| 9,091,672 | B2 | 7/2015 | Wilmes |
| 9,733,221 | B2 | 8/2017 | Zimmermann et al. |
| 9,851,282 | B2 | 12/2017 | Inoue |
| 10,191,072 | B2 | 1/2019 | Gomm et al. |
| 10,788,466 | B2 | 9/2020 | Midorikawa |
| 11,041,873 | B2 | 6/2021 | Van Grinsven |
| 11,320,346 | B2 | 5/2022 | Sun |
| 11,879,875 | B2 * | 1/2024 | Burnett .................. G01N 30/16 |
| 11,913,916 | B2 * | 2/2024 | Burnett .................. G01N 30/24 |
| 2002/0025255 | A1 | 2/2002 | Wright et al. |
| 2011/0120213 | A1 | 5/2011 | Hirayama et al. |
| 2018/0088090 | A1 | 3/2018 | Yasunaga |
| 2018/0252682 | A1 | 9/2018 | Hanafusa |
| 2019/0383776 | A1 | 12/2019 | Simpson et al. |
| 2020/0200783 | A1 | 6/2020 | Durco |
| 2021/0215730 | A1 | 7/2021 | Yamaguchi et al. |
| 2021/0293761 | A1 | 9/2021 | Burnett et al. |
| 2022/0128520 | A1 | 4/2022 | Okoba et al. |

FOREIGN PATENT DOCUMENTS

| | | | |
|---|---|---|---|
| CN | 208984092 | U | 6/2019 |
| CN | 110753842 | A | 2/2020 |
| EP | 0724901 | A1 | 8/1996 |
| EP | 3928699 | B1 | 8/2022 |
| JP | H0128456 | Y2 | 8/1989 |
| JP | 2009222398 | A | 10/2009 |

| | | | |
|---|---|---|---|
| WO | 2000024306 | A2 | 5/2000 |
| WO | 2012096649 | A1 | 7/2012 |
| WO | 2014162921 | A1 | 10/2014 |
| WO | 2015079873 | A1 | 6/2015 |
| WO | 2017043192 | A1 | 3/2017 |
| WO | 2018190907 | A1 | 10/2018 |
| WO | 2019048570 | A1 | 3/2019 |
| WO | 2023123045 | A1 | 7/2023 |

OTHER PUBLICATIONS

Final Office Action in U.S. Appl. No. 17/203,127 mailed on Mar. 15, 2023.

Non-Final Office Action in U.S. Appl. No. 17/203,127 mailed on Nov. 22, 2022.

Notice of Allownace in U.S. Appl. No. 17/203,127 mailed on Sep. 28, 2023.

International Search Report and Written Opinion in PCT/US2021/022552 mailed on Jul. 8, 2021.

Partial Search Report in European Patent Application No. 21720036.9 mailed on Dec. 13, 2023.

Invitation to Pay Addtional Fees in PCT/US2021/022535 mailed on Jul. 8, 2021.

International Search Report and Written Opinion in PCT/US2021/022535 mailed on Sep. 2, 2021.

International Preliminary Report on Patentability in PCT/US2021/022535 mailed on Sep. 29, 2022.

International Preliminary Report on Patentability in PCT/US2021/022552 mailed on Sep. 29, 2022.

Non-Final Office Action in U.S. Appl. No. 17/203,021 mailed on Nov. 22, 2022.

"Agilent 1100 Series Autosampler Thermostat" Aglient Technologies, Jul. 2002.

"Agilent 1200 Series Autosampler Thermostat" Aglient Technologies, Nov. 2008.

Final Office Action in U.S. Appl. No. 17/203,021 mailed on Mar. 15, 2023.

Notice of Allowance in U.S. Appl. No. 17/203,021 mailed on Aug. 16, 2023.

Examination Report for European Patent Application No. 21720036.9 mailed on Jan. 29, 2025.

Extended Search Report in European Patent Application No. 25166261.5 mailed on Oct. 28, 2025.

Partial Search Report in European Patent Application No. 25166261.5 mailed on Aug. 7, 2025.

First Examination Report in European Patent Application No. 21720036.9 mailed on Apr. 25, 2024.

Observations by a Third Party in European Patent Application No. 21720036.9 mailed on Mar. 21, 2025.

YouTube Video, "CLAM-2000", Shimadzu Analytical and Measuring Instruments, https://www.youtube.com/watch?v=650uOsF-Wek, Apr. 10, 2017.

Summons to Attend Oral Proceedings in European Patent Application No. 21720036.9 mailed on Nov. 14, 2025.

Observations by a Third Party in European Patent Application No. 21720036.9 mailed on Apr. 30, 2026.

* cited by examiner

NEEDLE DRIVE, SYSTEM AND METHOD

RELATED APPLICATION

This application is a continuation of U.S. patent application Ser. No. 17/203,127 filed on Mar. 16, 2021 and titled "Needle Drive, System and Method," which claims the benefit of the earlier filing date of U.S. Provisional Patent Application Ser. No. 62/990,653 filed Mar. 17, 2020 and titled "Needle Drive, System and Method," the entirety of which is incorporated herein by reference.

FIELD OF THE INVENTION

The invention relates generally to liquid chromatography systems. More particularly, the invention relates to liquid chromatography sample managers, and associated needle drive systems and methods.

BACKGROUND

Chromatography is a set of techniques for separating a mixture into its constituents. For instance, in a liquid chromatography system, a pump takes in and delivers a mixture of liquid solvents to a sample manager, where an injected sample awaits its arrival. In an isocratic chromatography system, the composition of the liquid solvents remains unchanged, whereas in a gradient chromatography system, the solvent composition varies over time. The mobile phase, comprised of a sample dissolved in a mixture of solvents, passes to a column, referred to as the stationary phase. By passing the mixture through the column, the various components in the sample separate from each other at different rates and thus elute from the column at different times. A detector receives the elution from the column and produces an output from which the identity and quantity of the analysis may be determined.

Prior to being provided into the liquid chromatography system, the sample may be provided to a sample manager. The sample manager may be configured to prevent the sample from degrading or becoming otherwise damaged while providing the sample into the liquid chromatography system. Sample managers are regularly interacted with by technicians and as such must be user friendly, dependable, accurate, reliable, serviceable, and cost effective. Improved sample managers, systems and methods, would be well received in the art.

SUMMARY

In one embodiment, a liquid chromatography system comprises: a solvent delivery system; a sample manager having a thermal chamber, the thermal chamber including: a sampling mechanism mounted within the thermal chamber, the sampling mechanism including; a sample platter; a needle drive including: a base including a shaft configured to rotate about a vertical axis, the base attachable to an interior of a sample manager of a liquid chromatography system; a needle assembly attached to the base, the needle assembly including a sample needle; and a drive system attached to the base, the drive system including a sample needle motor configured to impart vertical movement of the sample needle; and a sample delivery system in fluidic communication with solvent delivery system, the sample delivery system configured to transfer a first sample from a first sample vial carrier located in the sample platter into a chromatographic flow stream; a liquid chromatography column located downstream from the solvent delivery system and the sample delivery system; and a detector located downstream from the liquid chromatography column.

Additionally or alternatively, the needle assembly further includes a puncture needle, and wherein the drive system further includes a puncture needle motor configured to impart vertical movement on the puncture needle independently from the vertical movement of the sample needle, and wherein the needle assembly further includes a stripper foot movable in the vertical direction, wherein the stripper foot includes an opening through which the puncture needle is configured to extend during puncturing.

Additionally or alternatively, the needle drive further including a sensor system, the sensor system including a flexible circuit board attached to the base and configured to bend with the rotation of the shaft about the vertical axis, the sensor system further comprising a stripper foot movement sensor configured to determine that the stripper foot has been moved in a vertical direction a predetermined distance, a sample needle movement sensor configured to determine that the sample needle has been moved in a vertical direction to a sample needle home position, and a puncture needle movement sensor configured to determine that the puncture needle has been moved in a vertical direction to a puncture needle home position.

Additionally or alternatively, the needle drive further includes: a shaft motor configured to impart rotation on the shaft about the vertical axis; and a magnetic encoder configured to maintain precise rotational position of the shaft of the base.

Additionally or alternatively, the base of the needle drive further includes needle arm housing supporting the shaft in at least two locations, the needle arm housing attached to an interior of the thermal chamber of the sample manager with a plurality of accessible bolts.

Additionally or alternatively, the needle assembly is attachably removable from the base of the needle drive with a plurality of accessible bolts, wherein the sample manager further includes a door providing a technician access to the thermal chamber when opened, wherein the needle drive is removable from the thermal chamber through the door.

In another embodiment, a liquid chromatography sample manager comprises: a thermal chamber; a sample platter mounted in the thermal chamber; a needle drive including: a base including a shaft configured to rotate about a vertical axis, the base attachable to an interior of a sample manager of a liquid chromatography system; a needle assembly attached to the base, the needle assembly including a sample needle; and a drive system attached to the base, the drive system including a sample needle motor configured to impart vertical movement of the sample needle; and a sample delivery system configured to transfer a first sample from a first sample vial carrier located in the sample platter into a chromatographic flow stream.

Additionally or alternatively, the needle assembly further includes a puncture needle, and wherein the drive system further includes a puncture needle motor configured to impart vertical movement on the puncture needle independently from the vertical movement of the sample needle, and wherein the needle assembly further includes a stripper foot movable in the vertical direction, wherein the stripper foot includes an opening through which the puncture needle is configured to extend during puncturing.

Additionally or alternatively, the needle drive further including a sensor system, the sensor system including a flexible circuit board attached to the base and configured to bend with the rotation of the shaft about the vertical axis, the sensor system further comprising a stripper foot movement sensor configured to determine that the stripper foot has been moved in a vertical direction a predetermined distance, a sample needle movement sensor configured to determine that the sample needle has been moved in a vertical direction to a sample needle home position, and a puncture needle movement sensor configured to determine that the puncture needle has been moved in a vertical direction to a puncture needle home position.

Additionally or alternatively, the needle drive further includes: a shaft motor configured to impart rotation on the shaft about the vertical axis; and a magnetic encoder configured to maintain precise rotational position of the shaft of the base.

Additionally or alternatively, the base of the needle drive further includes needle arm housing supporting the shaft in at least two locations, the needle arm housing attached to an interior of the thermal chamber of the sample manager with a plurality of accessible bolts.

Additionally or alternatively, the needle assembly is attachably removable from the base of the needle drive with a plurality of accessible bolts, wherein the liquid chromatography sample manager further comprises a door providing a technician access to the thermal chamber when opened, wherein the needle drive is removable from the thermal chamber through the door.

In another embodiment, a needle drive for a liquid chromatography system comprises: a base including a shaft configured to rotate about a vertical axis, the base attachable to an interior of a sample manager of a liquid chromatography system; a needle assembly attached to the base, the needle assembly including a sample needle; and a drive system attached to the base, the drive system including a sample needle motor configured to impart vertical movement of the sample needle.

Additionally or alternatively, the needle assembly further includes a puncture needle, and wherein the drive system further includes a puncture needle motor configured to impart vertical movement on the puncture needle independently from the vertical movement of the sample needle.

Additionally or alternatively, the needle assembly further includes a stripper foot movable in the vertical direction, wherein the stripper foot includes an opening through which the puncture needle is configured to extend during puncturing.

Additionally or alternatively, the needle assembly further comprises a sensor system, the sensor system including a flexible circuit board attached to the base and configured to bend with the rotation of the shaft about the vertical axis.

Additionally or alternatively, the sensor system further comprising a stripper foot movement sensor configured to determine that the stripper foot has been moved in a vertical direction a predetermined distance, a sample needle movement sensor configured to determine that the sample needle has been moved in a vertical direction to a sample needle home position, and a puncture needle movement sensor configured to determine that the puncture needle has been moved in a vertical direction to a puncture needle home position.

Additionally or alternatively, the needle drive includes a shaft motor configured to impart rotation on the shaft about the vertical axis.

Additionally or alternatively, the needle drive further includes a magnetic encoder configured to maintain precise rotational position of the shaft of the base.

Additionally or alternatively, the base further includes needle arm housing supporting the shaft in at least two locations, the needle arm housing attachable to the interior of the sample manager of the liquid chromatography system with a plurality of accessible bolts.

Additionally or alternatively, the needle assembly is attachably removable from the base with a plurality of accessible bolts.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

As described herein, prior to performing a liquid chromatography run, a technician loads an array of vials containing samples onto a sample-vial carrier, places the sample-vial carrier onto a drawer, and slides the drawer into a bay within a sample platter of a thermal chamber of a sample manager system. The sample manager system includes a sample delivery system that is configured to transfer the sample from the sample-vial carrier into a chromatographic flow stream. The thermal chamber includes sampling mechanism which includes a rotating sample platter with improved sample capacity and sampling accuracy. A sampling needle as a part of the sampling mechanism is located on a rotating needle arm that, in combination with the rotating sample platter, provides complete needle coverage over the bays within the sample platter. The entirety of the needle arm is positioned and sized within the thermal chamber such that the needle arm is removable out a front door of the thermal chamber for case of service. Encoders on the rotating needle arm and rotating sample platter maintain sufficient resolution for accurate sampling. These rotating needle arm may be calibrated using an accuracy-ensuring calibration process.

Figure 1:
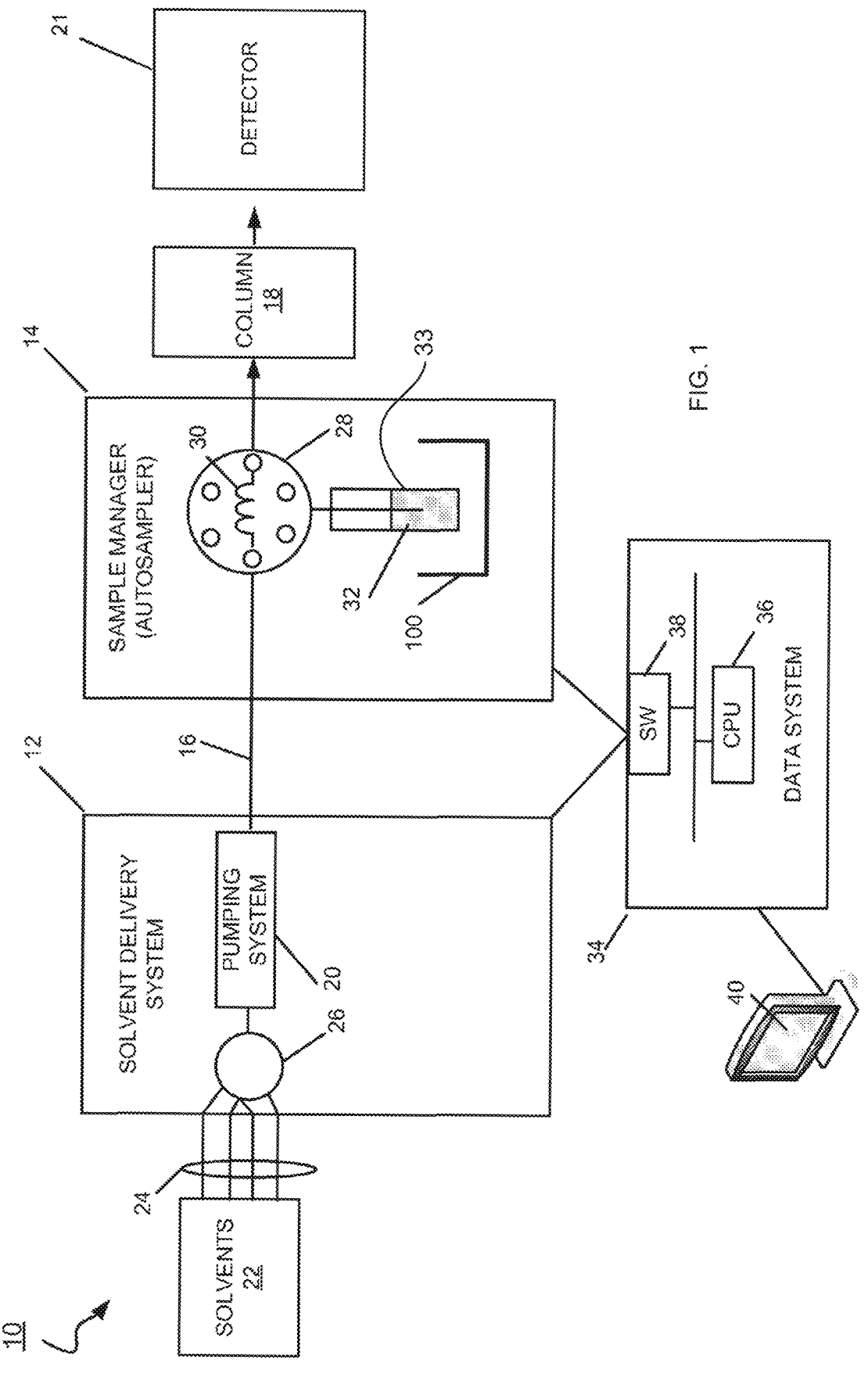
FIG. 1 depicts a schematic view of a liquid chromatography system including a sample manager in accordance with one embodiment.

The features of the sample delivery system and sample manager thermal chamber described herein may be applicable to any liquid chromatography system configured to deliver samples into a chromatographic flow stream. As one example, FIG. 1 shows an embodiment of a liquid chromatography system 10 for separating a mixture into its constituents. The liquid chromatography system 10 includes a solvent delivery system 12 in fluidic communication with a sample manager 14 (also called an injector or an autosampler) through tubing 16. The sample manager 14 is in fluidic communication with a chromatographic column 18. A detector 21 for example, a mass spectrometer, is in fluidic communication with the column 18 to receive the elution.

The solvent delivery system 12 includes a pumping system 20 in fluidic communication with solvent reservoirs 22 from which the pumping system 20 draws solvents (liquid) through tubing 24. In one embodiment, the pumping system 20 is embodied by a low-pressure mixing gradient pumping system having two pumps fluidically connected in series. In the low-pressure gradient pumping system, the mixing of solvents occurs before the pump, and the solvent delivery system 12 has a mixer 26 in fluidic communication with the solvent reservoirs 22 to receive various solvents in metered proportions. This mixing of solvents (mobile phase) composition that varies over time (i.e., the gradient).

The pumping system 20 is in fluidic communication with the mixer 26 to draw a continuous flow of gradient therefrom for delivery to the sample manager 14. Examples of solvent delivery systems that can be used to implement the solvent delivery system 12 include, but are not limited to, the ACQUITY Binary Solvent Manager and the ACQUITY Quaternary Solvent Manager, manufactured by Waters Corp. of Milford, Mass.

The sample manager 14 may include an injector valve 28 having a sample loop 30. The sample manager 14 operates in one of two states: a load state and an injection state. In the load state, the position of the injector valve 28 is such that the sample manager loads the sample 32 into the sample loop 30. The sample 32 is drawn from a vial contained by a sample vial carrier. "Sample vial carrier" herein means any device configured to carry a sample vial such as a well plate, sample vial carrier, or the like. In the injection state, the position of the injector valve 28 changes so that the sample manager 14 introduces the sample in the sample loop 30 into the continuously flowing mobile phase from the solvent delivery system. The mobile phase thus carries the sample into the column 18. In other embodiments, a flow through needle (FTN) may be utilized instead of a Fixed-Loop sample manager. Using an FTN approach, the sample may be pulled into the needle and then the needle may be moved into a seal. The valve may then be switched to make the needle in-line with the solvent delivery system.

The liquid chromatography system 10 further includes a data system 34 that is in signal communication with the solvent delivery system 12 and the sample manager 14. The data system 34 has a processor 36 and a switch 38 (e.g. an Ethernet switch) for handling signal communication between the solvent delivery system 12 and sample manager 14, as described herein. Signal communication among the various systems and instruments can be electrical or optical, using wireless or wired transmission. A host computing system 40 is in communication with the data system 34 by which a technician can download various parameters and profiles (e.g., an intake velocity profile) to the data system 34.

Figure 2:
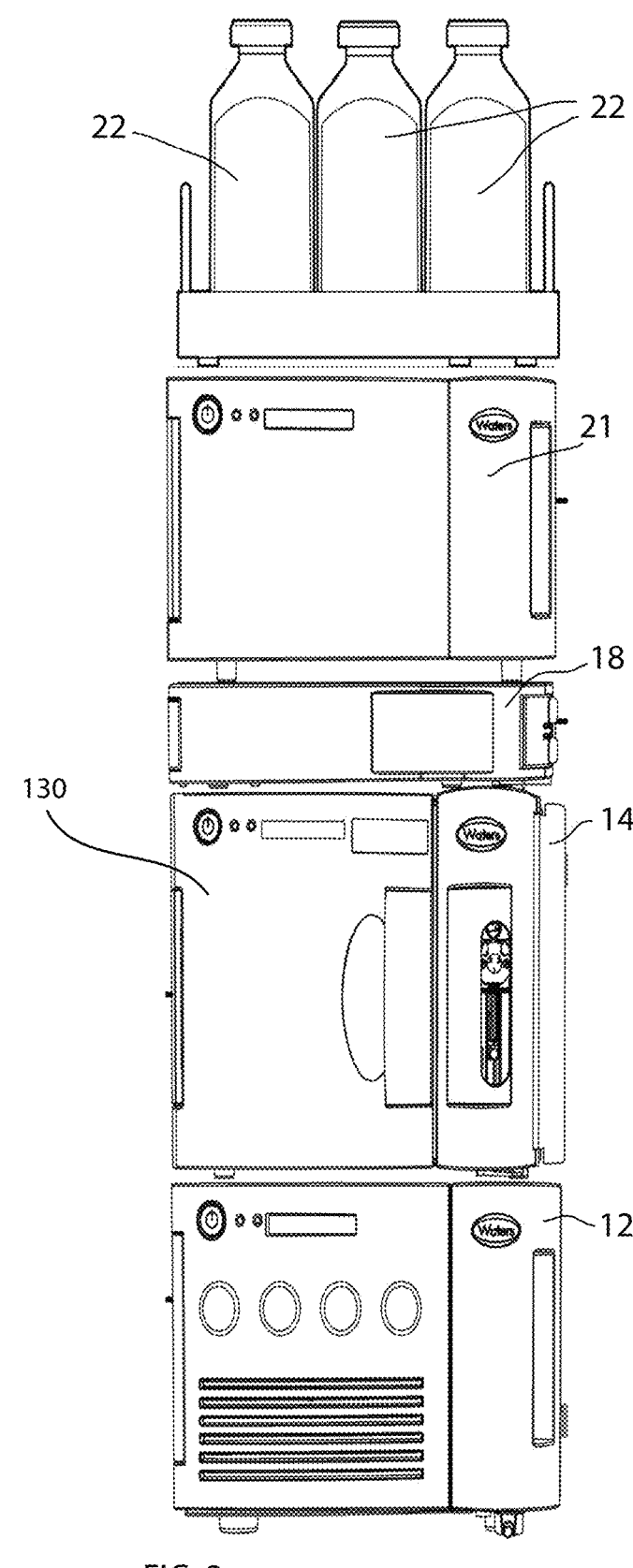
FIG. 2 depicts a perspective view of a liquid chromatography system including the sample manager of FIG. 1 in accordance with one embodiment.

FIG. 2 shows a perspective view of the liquid chromatography system 10 including the sample manager 14, the detector 21, the chromatographic column 18, the solvent delivery system 12, and the solvents 22. Each of the sample manager 14, the detector 21, the chromatographic column 18, the solvent delivery system 12 may include a housing or body within which the various features may be housed, such as the data system 34, the sample loop 30 and injector valve 28, the pumping system 20, the mixer 26 and the tubing 24. The various components 12, 14, 18, 19, 21, 22 may be interconnected with fluidic tubes and in signal communication to the data system 34 of the system. The liquid chromatography system 10 is shown with the solvent delivery system 12, sample manager 14, chromatographic column 18, detector 21 and a tray for holding the solvents 22 stacked together.

Figure 3:
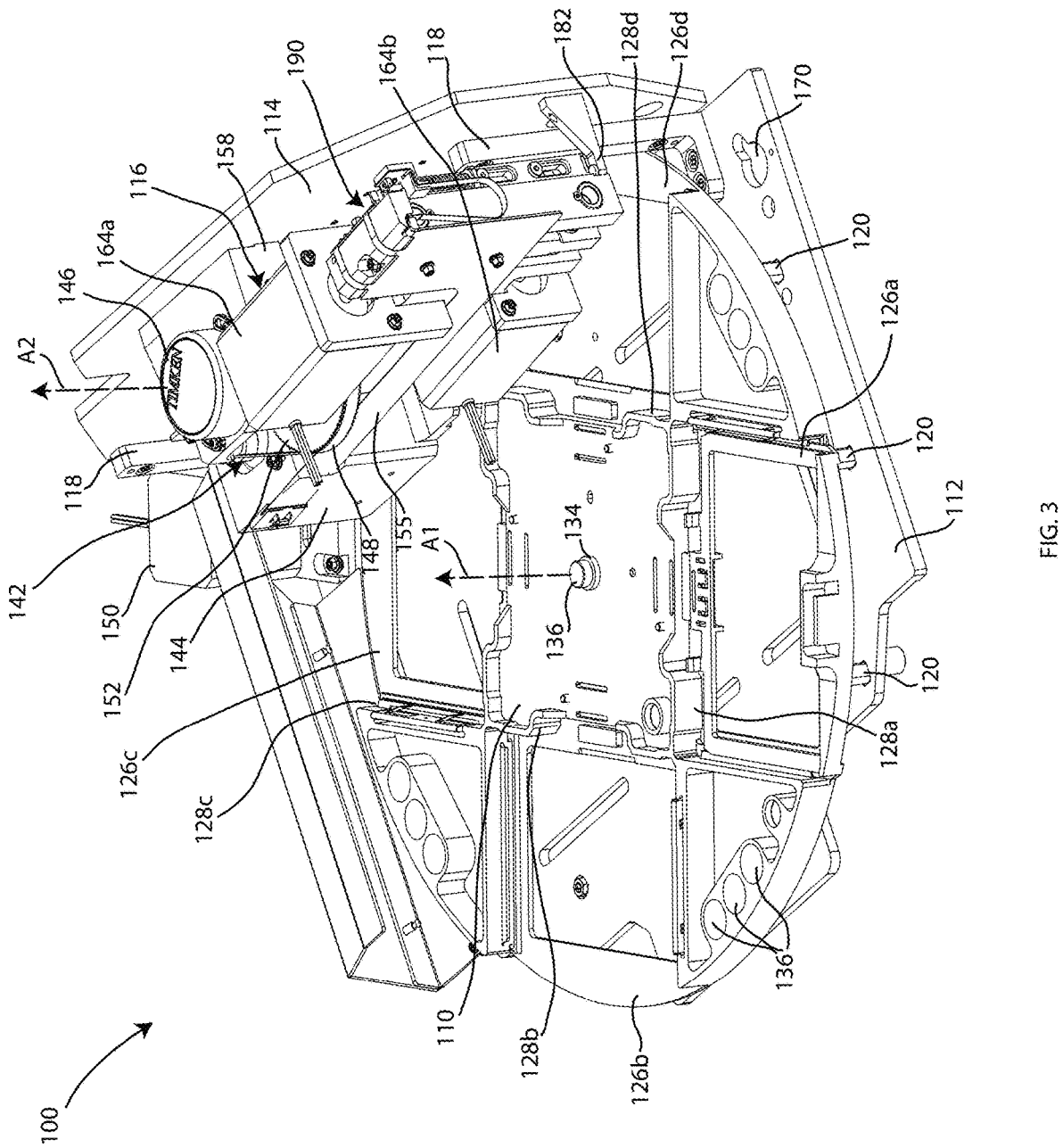
FIG. 3 depicts another perspective view of the interior of the sample manager of FIGS. 1 and 2, in accordance with one embodiment.

FIG. 3 depicts a perspective view of the sampling mechanism 100 of the sample manager 14 of FIGS. 1 and 2, in accordance with one embodiment. As shown the sampling mechanism 100 includes a sample platter 110 attached to datum base 112. A vertical frame 114 is attached and extends perpendicular from the datum base 112. A needle arm 116 is attached to the vertical frame 114. The needle arm 116 includes a puncture needle 122 (shown in FIG. 4) and a sample needle (not shown) as part of a sample delivery system that is in fluidic communication with the solvent delivery system 12. The sample needle may be configured to obtain or otherwise draw the sample 32 from a sample vial 33 (shown in FIG. 2). Thereafter, the sample delivery system of the liquid chromatography system 10 is configured to transfer the sample 32 into a chromatographic flow stream and to the column 18 located downstream from the sample delivery system, and then to the detector 21 located downstream from the column 18. The sample vial 33 may be one of many vials located within up to four sample vial carriers (not shown), located on the sample platter 110.

The sample platter 110 may be configured to rotate 360 degrees about a first vertical axis A1 while the needle arm 116 is configured to at least partially rotate about a second vertical axis A2. These two rotations may provide for sufficient coverage by the needle arm 116 across all the sample vial carriers 124 within the sample platter 110. The rotating needle arm 116, in combination with the rotation of the sample platter 110, may thereby be configured to move the sample needle 122 into position to access any location on the sample platter 110 that holds a sample vial 33 within a sample vial carrier.

As shown, the sample platter 110 includes a circular frame that includes four bays—a first carrier bay 126a, a second carrier bay 126b, a third carrier bay 126c, and a fourth carrier bay 126d. The carrier bays 126a, 126b, 126c, 126d are disposed equidistant about a perimeter of the circular sample platter 110. In other words, the carrier bays, 126a, 126b, 126c, 126d are disposed circumferentially 90 degrees from each other about the circular sample platter 110. As described above, the rotating needle arm 116, in combination with the rotation of the sample platter 110, is configured to move the sample needle 122 directly above any location covered by the respective perimeters of the respective carrier bays 126a, 126b, 126c, 126d. The platter can include four bays as shown but may also include three bays or extended to even more than four bays in other embodiments. The bays may be equidistant from each other or may be staggered in other manners about the circumference of the circular sample platter 110.

Each of the carrier bays 126a, 126b, 126c, 126d is shown as a drawer that slides into and out of a bay drawer receiver 128a, 128b, 128c, 128d. The carrier bays 126a, 126b, 126c, 126d may be configured to be pulled from respective bay drawer receivers 128a, 128b, 128c, 128d radially outwardly in order to facilitate case of loading of sample vial carriers into and out a front door 130 of the sample platter (shown in FIG. 2). The integration of the carrier bays 126a, 126b, 126c, 126d and the respective bay drawer receivers 128a, 128b, 128c, 128d may be configured to stop the carrier bays 126a, 126b, 126c, 126d before the carrier bays 126a, 126b, 126c, 126d become fully disconnected from the bay drawer receivers 128a, 128b, 128c, 128d. Alternatively, the bezel of the sampling mechanism 100 may include a structure that prevents the carrier bays 126a, 126b, 126c, 126d from becoming fully disconnected from the bay drawer receivers 128a, 128b, 128c, 128d.

The carrier bays 126a, 126b, 126c, 126d are each configured for receiving sample vial carriers. The sample manager 100 may be configured to receive and process samples within all four carrier bays 126a, 126b, 126c, 126d. In addition to sliding in and out of the bay drawer receivers 128a, 128b, 128c, 128d via a track system, the carrier bays 126a, 126b, 126c, 126d may include magnets positioned underneath that are configured to magnetically retain the sample vial carriers into position within the carrier bays 126a, 126b, 126c, 126d. Corresponding magnets may be located a radially inward position within the carrier bays 126a, 126b, 126c, 126d to further ensure that the carrier bay 126a, 126b, 126c, 126d is in position properly (i.e. fully inserted) relative to the bay drawer receivers 128a, 128b, 128c, 128d. Leaf springs 132 may be configured to bias received sample platters toward the left most wall of the respective carrier bays 126a, 126b, 126c, 126d, while the magnetic structure retains the received sample platters against the radially inward wall of the respective carrier bays 126a, 126b, 126c, 126d.

The sample platter 110 includes a middle opening 134 for receiving a post 136 around which the sample platter 110 is configured to rotate about the vertical axis A1. The sample platter 110 further includes additional openings 136 disposed around the perimeter in between the carrier bays 126a, 126b, 126c, 126d configured to receive and hold larger single individual vials (not shown) or other samples. The needle arm 116 (and the needle thereof) may be configured to be positioned over each of the perimeter additional openings 136.

The sample platter 110 is shown mounted to the datum base 112. The datum base 112 may be a metallic plate that is mounted to a thermal chamber frame (not shown) within the sample manager 14. The datum base 112 may include openings through which deflection limiting columns 120 extend. The deflection limiting columns 120 may be configured to prevent deflection of the sample platter 110 beyond a specific distance relative to the datum base 112 before being stopped. The deflection limiting columns 120 may be keyed to a channel in the bottom of the sample platter 110 and may act as bearings to allow rotation of the sample platter 110 about the datum base 112. Rotation of the sample platter 110 about the datum base 112 may be created by a motor 150 disposed on the datum base 112 proximate the perimeter of the sample platter 110. The datum base 112 further includes a plurality of threaded openings configured to receive bolts for attaching a right-angle bracket 118 thereto at each side. The right-angle brackets 118 may be configured to attach the vertical frame 114 to the datum base 112 in a perpendicular orientation. An encoder (not shown) may further be attached to the sample platter 110 to maintain positioning of the sample platter 110 relative to the datum base 112.

The vertical frame 114 is attached to the datum base 112 such that the vertical frame 114 extends through the circumference of the sample platter 110. To account for this location being over the sample platter 110, the vertical frame 114 includes an opening 140 (shown in FIG. 4) or cutout through which the sample platter 110 and any received sample vial carrier 124a, 124b, and any received sample vials 33, are configured to pass. The opening 140 is dimensioned tall enough to receive the tall sample vial carriers 124b without causing interference. The vertical frame 114 creates a surface over the opening 140 upon which to mount the needle arm 116.

The needle arm 116 is shown including a drive mechanism 142 and a motor 144. The motor 144 is configured to rotate about an axis that rotates a belt 148, which in turn rotates a pulley 152. Rotation of the pulley 152 may be configured to impart rotation of the needle arm 116 about the second vertical axis A2. The rotation of the needle arm 116 may be independent rotation relative to the rotation of the sample platter 110, and may be rotation about a different vertical axis A2 than the vertical axis A1 about which the sample platter 110 rotates.

Figure 4:
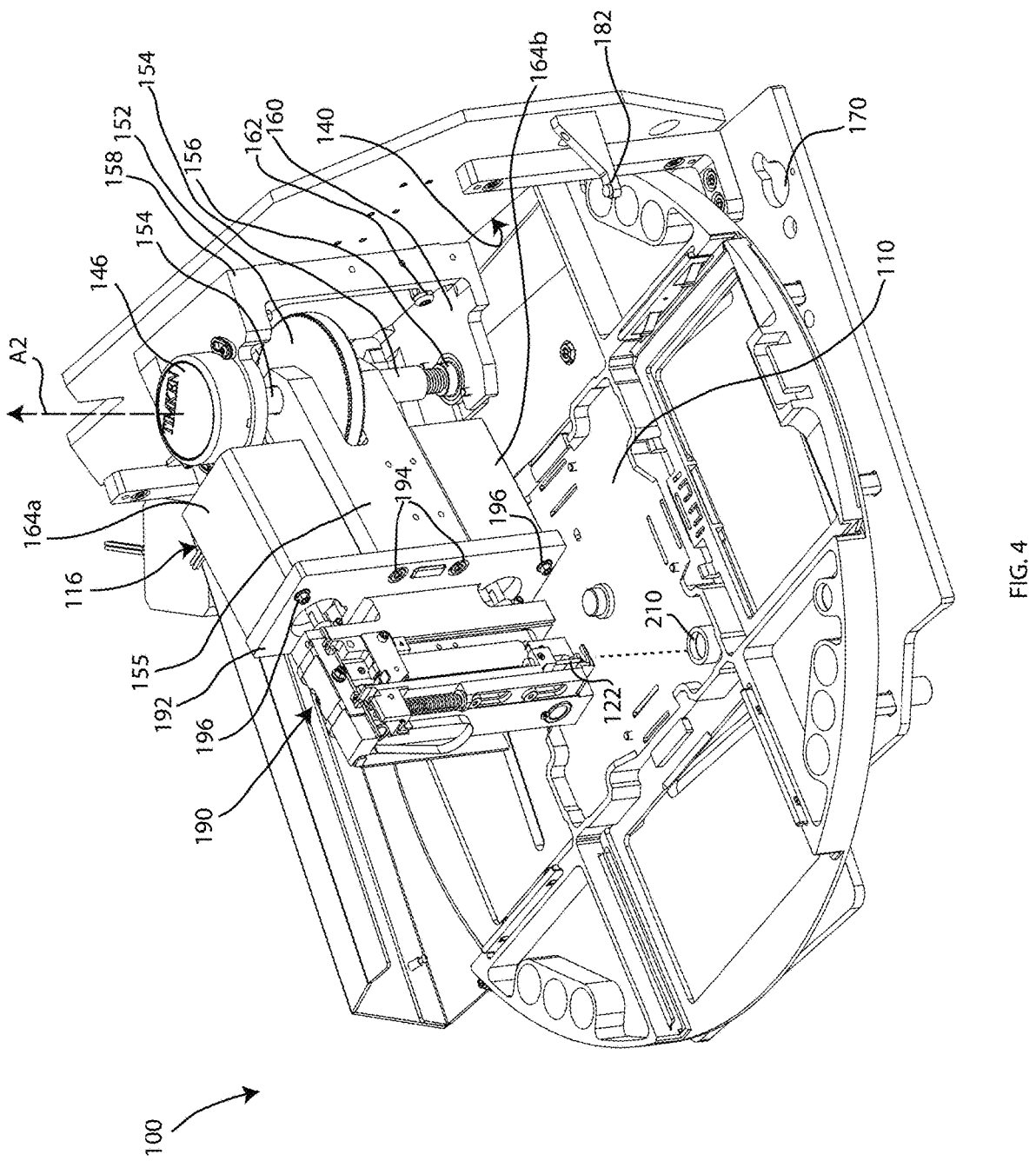
FIG. 4 depicts a perspective view of the interior of the sample manager of FIGS. 1 and 2 in a first calibration position, in accordance with one embodiment.

Referring now to FIG. 4, a perspective view of the interior of the sample manager 14 of FIGS. 1 and 2 is shown in a first calibration position, in accordance with one embodiment. The first calibration position shown in FIG. 4 is a position where the needle arm 116 is rotated counter clockwise about the second vertical axis A2 relative to the position shown in FIG. 3. As shown, a shaft 154 extends through the pulley 152 that is attached and configured to rotate with the pulley 152. The shaft 154 is connected to a rotating plate 155 that is configured to rotate with the shaft 154 and impart rotation on a needle assembly 190. The shaft 154 includes a biasing spring 232. A removable needle arm housing 158 is attached to the vertical frame 114. The removable needle arm housing 158 includes a horizontal plate 160 extending from just above the opening 140 in the vertical frame 114. The horizontal plate 160 includes a bushing 156 configured to receive the base of the shaft 154 and maintain the shaft 154 in alignment with the second vertical axis A2. The needle arm housing 158 is removably attached to the vertical frame 114 with a plurality of accessible bolts 162. The accessible bolts 162 are accessible through the door 130 of the sample manager 14. This may allow the entirety of the vertical frame 114 and the needle arm 116 and all of the components thereof to be easily removable through the door 130 during maintenance or part replacement.

The needle arm 116 further includes a magnetic encoder 146. The magnetic encoder 146 may be configured to determine rotational position of the needle arm 116 to whatever tolerance is necessary for accurate positioning of the sample needle 122. Likewise, the motor 150 may be equipped with an encoder for determining the rotational position of the sample platter 110. The two encoders in the system may be in communication with a control system (e.g. data system 34) for calibrating and controlling movement of the needle arm 116 and the sample platter 110. While magnetic encoders may be utilized, other encoders are contemplated, such as optical encoders.

The needle arm 116 is shown including two separate motors 164a, 164b configured to rotate two separate drive shafts. A first motor 164a is configured to rotate a first drive shaft 236 (shown in FIGS. 6 and 8) that enacts movement on the puncture needle 122. A second motor 164b is configured to rotate a second drive shaft 238 (shown in FIGS. 6 and 8) that enacts movement on a sample needle (not shown). The first and second motors 164a, 164b may be attached to the needle arm 116 such that the motors 164a, 164b rotate with the needle arm 116. The puncture needle 122 may operate in conjunction with the sample needle in order to puncture whatever material or membrane covers a sample vial. The two motors 164a, 164b may be configured to operate independently and may be controlled and programed by the control system and/or data system 34 for operational routines.

The needle assembly 190 of the needle arm includes a plate 192 having two accessible bolts 194 which may be accessible by a technician that opens the door 130 of the sample manager 14. Upon unbolting the accessible bolts 194, the technician may remove the needle assembly 190 and the attached motors 164a, 164b from the needle mechanism base 230. The needle assembly 190 and the motors 164a, 164b may be removable through the door 130 of the sample manager 14 without removing the needle mechanism base 230. Similarly, the motors 164a, 164b may be easily removed from the needle arm 116 by removal of one or more accessible motor bolts 196 from the plate 192. This may allow for the motors 164a, 164b to be easily replaced or removed for maintenance through the front door 130 of the sample manager 14 without removal of other components of the needle arm 116.

The sample delivery system may further include a fluidic tube (not shown) located between the sample needle and the liquid chromatography column 18. The fluidic tube may include a coiled portion configured to expand and contract during rotation of the needle arm 116 about the second vertical axis A2. The coiled portion may extend between the top of the needle arm 116 above the puncture needle 122 and to the vertical frame 114. The coiled portion may uncoil when the needle arm 116 rotates away from the vertical frame 114 and recoils when the needle arm 116 rotates toward the vertical frame 114. The coiled portion of the fluidic tube may be spiraled, bent, or otherwise curled in order to provide for lengthwise expansion and contraction in a predictable manner that does not interfere with the other movement of the various components within the sample manager 14.

Referring back to FIG. 3, the needle arm 116 is shown in this view having been rotated to a home position, whereby a projecting stop 182 that is connected to, coupled to, or integrated into, the vertical frame 114 is contacted with the needle assembly 190. The home position may be a position that is rotated to a stopping point, past which the needle arm 116 may not be capable of rotating. As shown, at the home position the needle arm 116 is rotated in a clockwise direction to a point of maximum rotation whereby the needle arm 116 is stopped from further clockwise rotation by the projecting stop 182.

Attached to the datum base 112 may be a needle wash system (not shown) extending from an opening 170 located in the datum base 112 near the home position or location. The needle wash system may include a plurality of liquid source tubes each configured to introduce water and/or other cleaning agent(s) to wash the sample needle 122 and/or the puncture needle when the needles are moved over the needle wash system. A wash process may include, for example, providing a first cleaning agent to the sample needle 122 from a first of the liquid source tubes, and then moving the sample needle 122 over the second of the liquid source tubes to be cleansed with water. Other wash processes and structure are contemplated as would be appropriate to wash needle(s) in the needle arm 116.

The needle arm 116 may be configured to rotate about the rotating shaft 154 and the second axis A2 an amount that allows complete coverage of the needle assembly 190 over the entirety of the working portion of the sample platter 110. The needle arm 116 may be configured to rotate more than 45 degrees but less than 90 degrees in the embodiment shown. Additional rotational movement than what is shown (i.e. equal to or greater than 90 degrees) is also contemplated in other embodiments.

Figure 5:
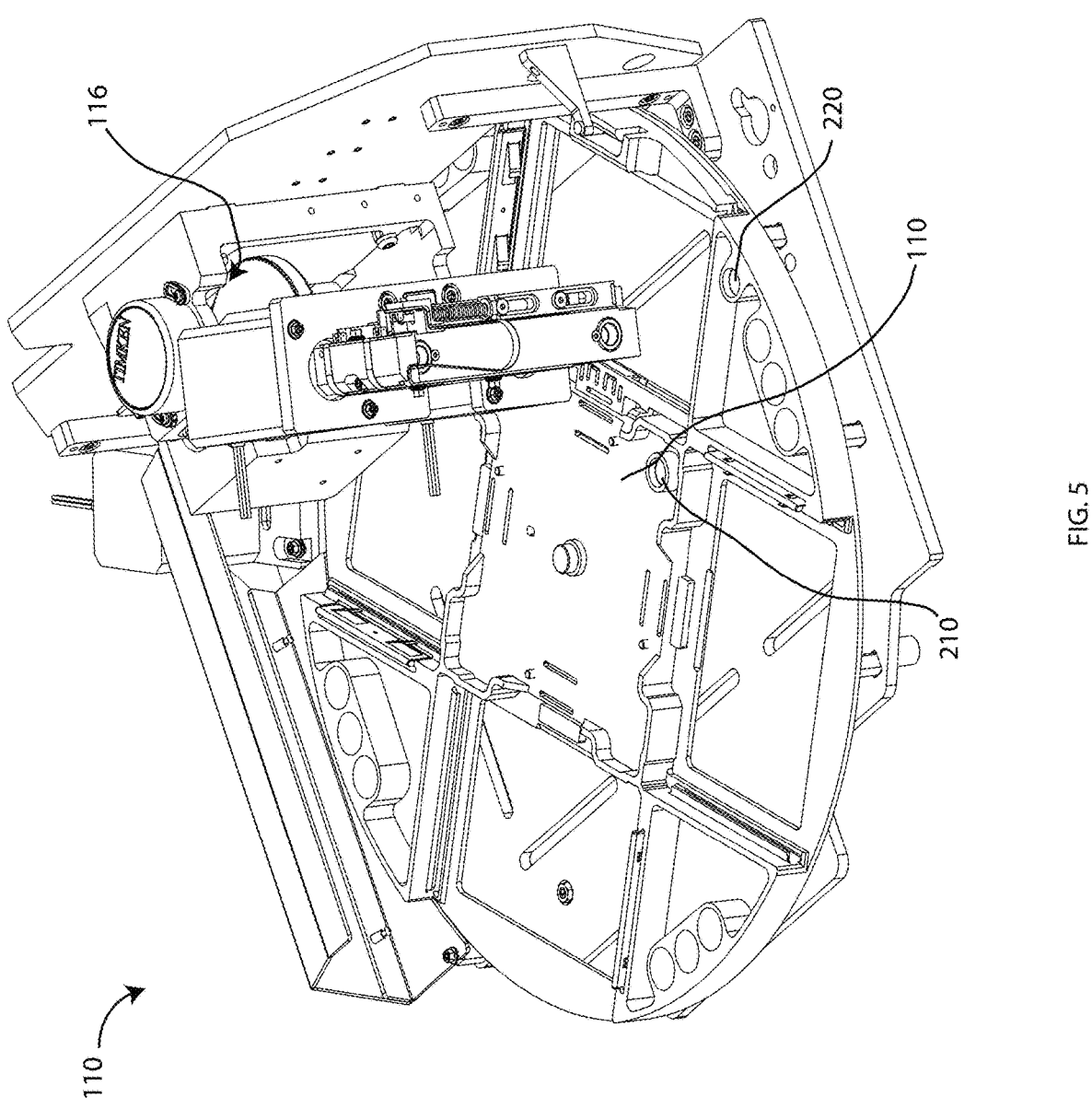
FIG. 5 depicts a perspective view of the interior of the sample manager of FIGS. 1 and 2 in a second calibration position, in accordance with one embodiment.

Referring to FIGS. 4 and 5, the interior of the sample manager 14 of FIGS. 1 and 2 is shown with the needle arm 116 located in two calibration positions, in accordance with one embodiment. In various contemplated embodiments, various calibration systems are contemplated. FIGS. 4 and 5 shown one exemplary calibration system in which the data system 34 and/or sample manager control system may be configured to calibrate the sampling mechanism 100 to use. One calibration process may include a first step, shown in FIG. 4, of moving the sample platter 110 and the needle arm 116 to align the needle with the first opening 210 in the sample platter and then recording a first encoder position of each the sample platter 110 and the needle arm 116. For example, the needle arm 116 may move counter-clockwise from the home position (shown in FIG. 3) to the position shown in FIG. 4 so that the puncture needle 122 (or sample needle) is directly above the first opening 210.

The calibration process may then include a second step of moving the sample platter 110 and the needle arm 116 to the position shown in FIG. 5, in order to align the puncture needle 122 (or sample needle) with the second opening 220 in the sample platter. The calibration process may then include recording a second encoder position of each the sample platter 110 and the needle arm 116. With the known first and second encoder positions, the data system 34 and/or sample manager control system may be configured to back-calculate the geometric parameters of the sampling mechanism 100 and thereby calibrate the movement and position of the sample platter 110 and the needle arm 116. The positional accuracy may be more precise than a typical prior art calibration process, as the inventive process described above does not rely on assumed geometric qualities being within a certain level of tolerance.

Figure 6:
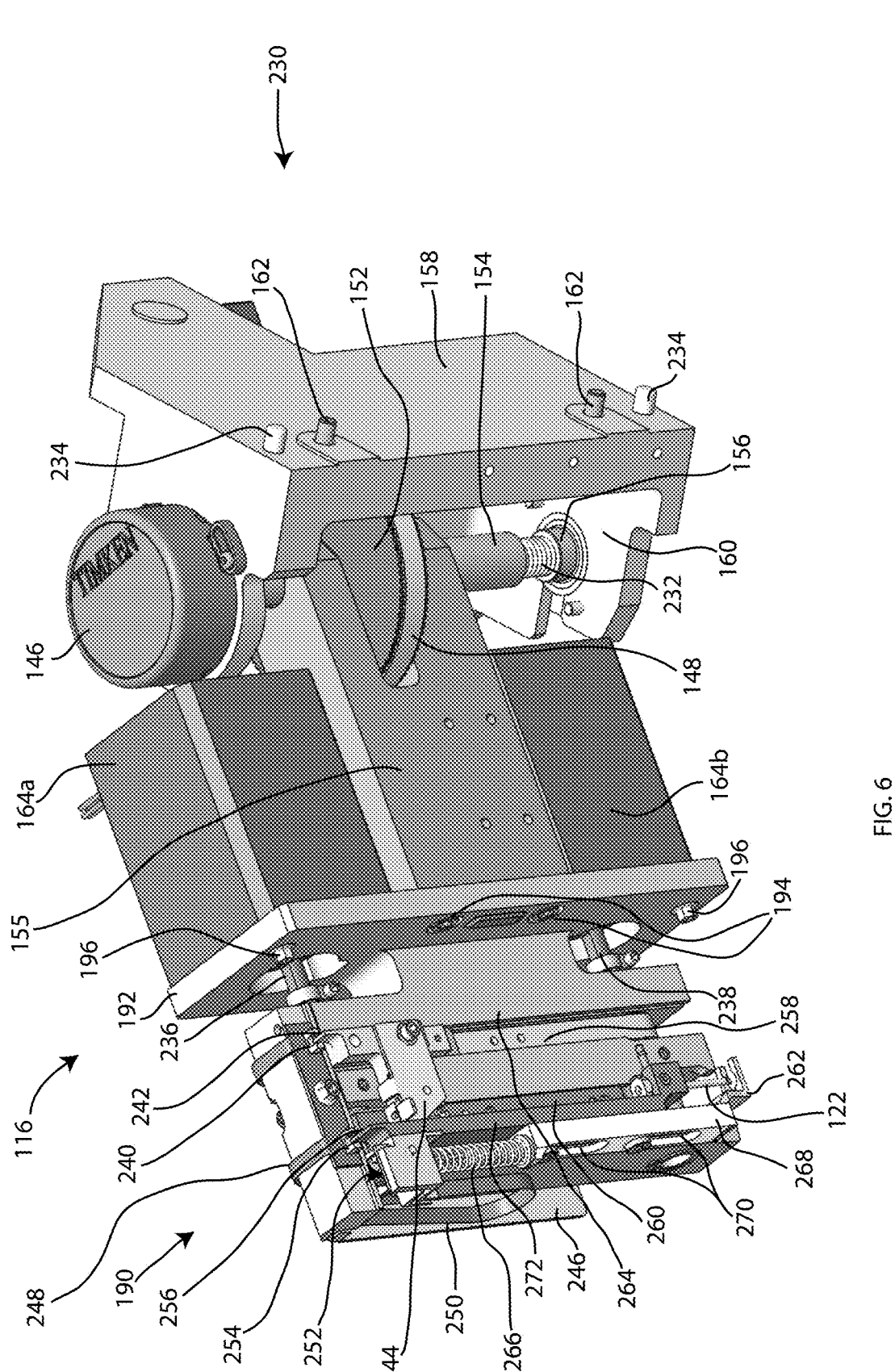
FIG. 6 depicts a perspective view of a needle arm detached from an interior of a sample manager, in accordance with one embodiment.

FIG. 6 depicts a perspective view of the needle arm 116 detached from the interior of the sample manager 14, in accordance with one embodiment. As shown, the needle arm 116 includes a base 230 that is removably attachable to the sample manager 14 of the liquid chromatography system 10.

The needle arm 116 further includes the needle assembly 190 that is removably attachable to the base 230. The removability of each of the base 230 from the sample manager 14 and the needle assembly 190 from the base 230 may be provided by accessible bolts, screws, pins or other easily accessible, engageable and/or disengageable coupling devices. The attachable removability of each of these components as described herein provides for case of servicing and replacing components of the needle arm 116 through a front door of the sample manager 14. Further, as described above, the needle arm 116 includes sufficient structure to provide for rotational movement of the arm about a vertical axis when the needle arm 116 is attached within a sample manager 14.

Figure 7:
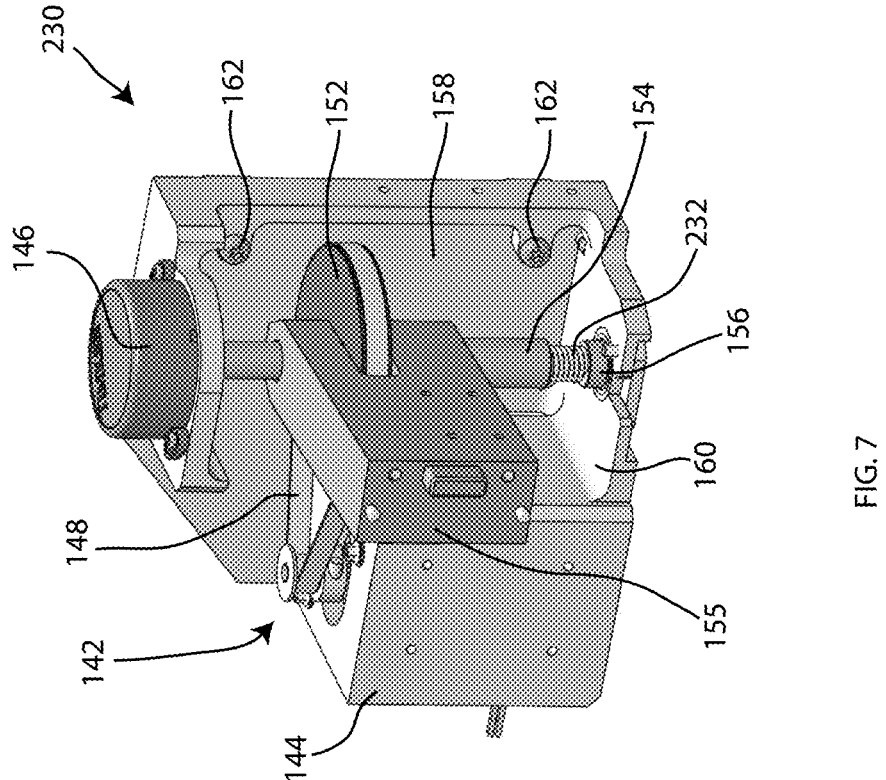
FIG. 7 depicts a perspective view of the needle arm of FIG. 6 with a needle assembly detached, in accordance with one embodiment.

FIG. 7 depicts a perspective view of the base 230 of the needle arm of FIG. 6 with the needle assembly 190 detached, in accordance with one embodiment. The base 230 includes the removable needle arm housing 158. The removable needle arm housing 158 provides a frame for attaching the base 230 to the interior of the sample manager 14 of the liquid chromatography system 10, such as by attachment of the removable needle arm housing 158 to the vertical frame 114. The removable needle arm housing 158 includes a flat vertical surface configured to abut the flat vertical surface of the vertical frame 114. As shown in FIG. 6, a plurality of alignment pins 234 located on a back surface of the needle arm housing 158 act in cooperation with the accessible bolts 162 to attach the flat vertical surface of the needle arm housing 158 with the flat vertical surface of the vertical frame 114. While not shown, the vertical frame 114 may include corresponding bores, or female receiving openings for receiving each of the accessible bolts 162 and alignment pins 234.

As shown, the base 230 includes the shaft 154 that is configured to rotate about the vertical axis A2. The removable needle arm housing 158 is configured to hold the shaft 154 at both a top location and a bottom location, while allowing the shaft 154 to rotate about the removable needle arm housing 158. Specifically, the removable needle arm housing 158 includes the lower horizontal plate 160 and an upper horizontal plate 161 extending from the flat vertical surface of the removable needle arm housing 158. The bushing 156 is disposed with an opening at the lower horizontal plate 160 allowing the shaft 154 to rotate therein.

The base 230 further includes the motor 144, the drive mechanism 142, the belt 148, the pulley 152, and the rotating plate 155. The drive mechanism 142 of the motor 144 may be a drive shaft, or the like, that the motor 144 is configured to cause to rotate. Rotation of the drive mechanism 142 further causes movement of the belt 148 and thereby rotation of the pulley 152 that is attached to the vertical shaft 154. The rotating plate 155 is attached to the shaft 154, and is configured to rotate with rotation of the shaft 154.

Figure 8:
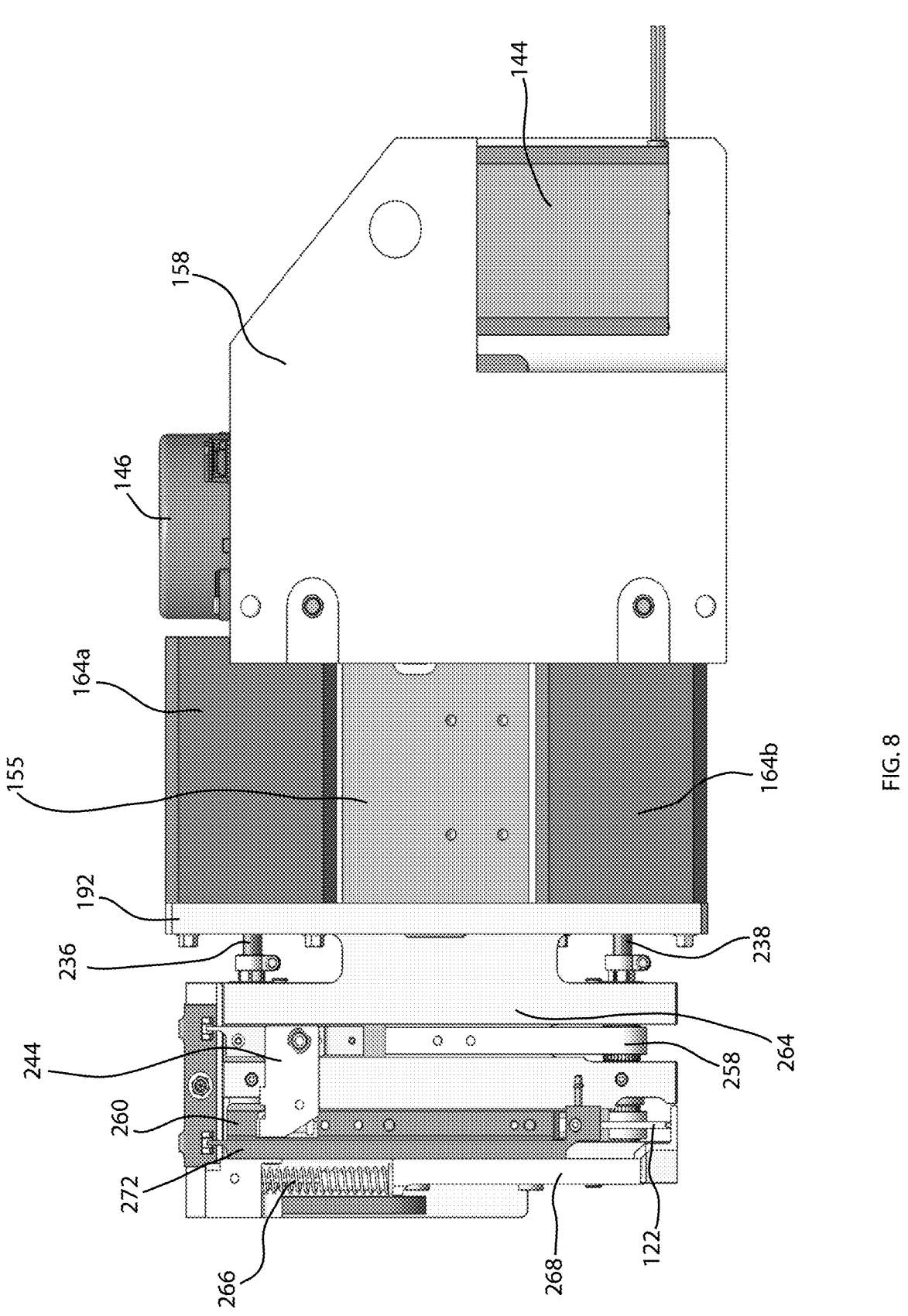
FIG. 8 depicts a side view of the needle arm of FIG. 6, in accordance with one embodiment.

FIG. 8 depicts a side view of the needle arm 116 in accordance with one embodiment including both the needle assembly 190 and the base 230. Referring to both the perspective view of FIG. 6 and the side view of FIG. 8, the base 230 is shown including each of the motor 144, the magnetic encoder 146, the housing 158 and the rotating plate 155. The needle assembly 190 includes a housing 264 or other body upon which the components of the needle assembly 190 are attached. As shown, the plate 192 of the housing 264 of the needle assembly 190 is attached to the base 230, and specifically to the rotating plate 155.

The needle assembly 190 includes a drive system. The drive system includes a first motor having a first drive shaft 236 attached to a top of the plate 192 of the housing 264. The needle assembly 190 further includes a second motor 164b having a second drive shaft 238 attached to a bottom of the plate 192 of the housing 264. The first motor 164a and first drive shaft 236 are configured to impart vertical motion or movement on the puncture needle 122 via imparting vertical motion or movement on a puncture needle axis 260. Likewise, the second motor 164b and the second drive shaft 238 are configured to impart vertical motion or movement on a sample needle 261 via imparting vertical motion or movement on a sample needle axis 258.

Further, a stripper foot 262 is attached to a stripper foot axis 268 that includes a spring loaded end 266 having a spring mechanism. The spring mechanism may be configured to compress during downward movement of the stripper foot 262 and stripper foot axis 268. In use, the stripper foot 262 may contact the top of a sample vial (not shown), after which the puncture needle 122 may be pushed through a protective membrane of the sample vial. After the puncture needle 122 has punctured this top protective membrane, the puncture needle 122 must be retracted from the sample vial and protective membrane. The stripper foot 262 may be configured to provide a downward force on the top of the sample vial so that the puncture needle 122 may be retracted properly without sticking to the protective membrane of the sample vial. The stripper foot 262 includes an opening through which the puncture needle 122 is configured to extend during puncturing.

As shown in FIG. 6, the stripper foot axis 268 is movable relative to the puncture needle axis 260, via two couplings 270. The couplings 270 may include a top elongated vertical opening and a bottom elongated opening in the stripper foot axis 268 through which top and bottom respective pins extend. The top and bottom respective pins are attached to a puncture needle coupling surface 272 of the puncture needle axis 260. The top and bottom elongated vertical openings cooperate with the pins so that the stripper foot axis 268 and the puncture needle axis 260 are connected or otherwise coupled in a manner that allows for vertical movement between the stripper foot axis 268 and the puncture needle axis 260. The maximum vertical movement between the stripper foot axis 268 and the puncture needle axis 260 is defined by the vertical length of the top and bottom elongated vertical openings in the stripper foot axis 268.

The sample needle 261 is located along the same vertical axis as the puncture needle 122. The sample needle 261 may be a needle having a smaller diameter than the puncture needle 122 such that the sample needle 261 is configured to extend through the larger diameter opening of the puncture needle 122. A needle holder 244 is located at a top of the sample needle axis 258. The sample needle holder 244 may be configured to removably receive the sample needle 261 at a location that aligns the sample needle 261 with the puncture needle 122. The sample needle holder 244 is attached to the sample needle axis 258 so that the sample needle holder 244, and thereby the sample needle 261, move when the sample needle axis 258 is driven or moved by the second motor 164b and the second drive shaft 238 thereof.

Figure 9:
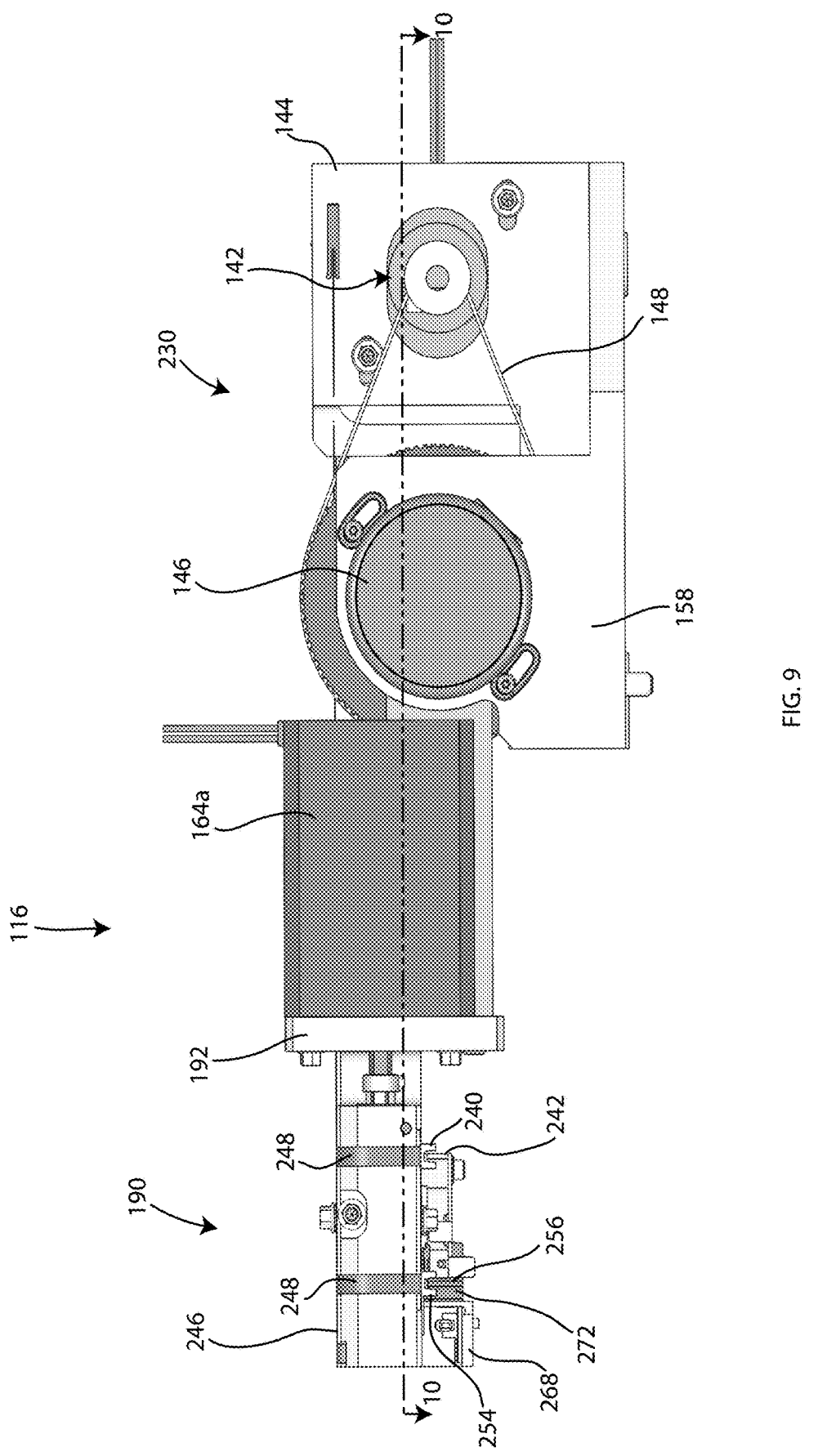
FIG. 9 depicts a top view of the needle arm of FIGS. 6 and 8, in accordance with one embodiment.

FIG. 9 depicts a top view of the needle arm 116, in accordance with one embodiment. Referring to both the perspective view of FIG. 6 and the top view of FIG. 9, a needle arm sensor system is shown. The sensor system includes a sample needle home sensor 240, a puncture needle home sensor 254, and a top sensor 252. The sensor system may further include a printed circuit board 246 configured to provide power, control signals and/or communication signals to and from the various sensors 240, 254, 252 in the sensor system. The printed circuit board 246 may be a flexible circuit board configured to flex with rotation of the needle assembly 190 about the vertical shaft 154. The printed circuit board 246 may be capable of performing its function without losing its signal and/or conductive integrity while being bent back and forth through the rotation of the needle assembly 190 about the vertical shaft 154 throughout the lifecycle of the needle arm 116. The sensor system and/or printed circuit board 246 and the sensors 240, 254, 252 may be in operable communication with a control system such as the data system 34, such that sensed information is provided to the data system 34 for processing.

The sample needle home sensor 240 is configured to sense movement of the sample needle axis 258 and/or determine when the sample needle axis 258 arrives in a home (top) position. The sample needle home sensor 240 may be configured to sense and/or determine that the sample needle 261 has been moved in a vertical direction a predetermined distance to a sample needle home position. The sample needle holder 244 is connected to the sample needle axis 258 and moves with the sample needle axis 258. The sample needle holder 244 includes an extending projection 242 configured to move between the two prongs of the sample needle home sensor 240. Thus, when the sample needle axis 258 moves to a top home position, the extending projection 242 is positioned between the two prongs of the sample needle home sensor 240, which thereby senses that the sample needle axis 258 is in the home position. A connecting conductor 248 extends between the printed circuit board 246 and the sample needle home sensor 240 configured to provide power and/or other control or communication signals to and from the sample needle home sensor 240.

The puncture needle home sensor 254 is configured to sense movement of the puncture needle axis 260 and/or determine when the puncture needle axis 260 arrives in a home (top) position. The puncture needle home sensor 254 may be configured to sense and/or determine that the puncture needle 122 has been moved in a vertical direction a predetermined distance to a puncture needle home position. The puncture needle axis 260, and specifically the puncture needle coupling surface 272 thereof, includes an extending projection 256 configured to move between the two prongs of the puncture needle home sensor 254. Thus, when the puncture needle axis 260 moves to a top home position, the extending projection 256 is positioned between the two prongs of the puncture needle home sensor 254, which thereby senses that the puncture needle axis 260 is in the home position. A connecting conductor 248 extends between the printed circuit board 246 and the puncture needle home sensor 254 configured to provide power and/or other control or communication signals to and from the puncture needle home sensor 254.

The top sensor 252 of the sensor system is configured to sense when the stripper foot 262 is compressed by a predetermined amount. This predetermined amount may correspond to a force acting on the stripper foot 262 by a top of the sample vial. A service loop 250 may extend from the printed circuit board 246 to the top sensor 252 for providing power and/or other control or communication signals to and from the top sensor 252. The top sensor 252 may be a stripper foot movement sensor configured to determine that the stripper foot 262 has been moved in a vertical direction over a predetermined distance.

Figure 10:
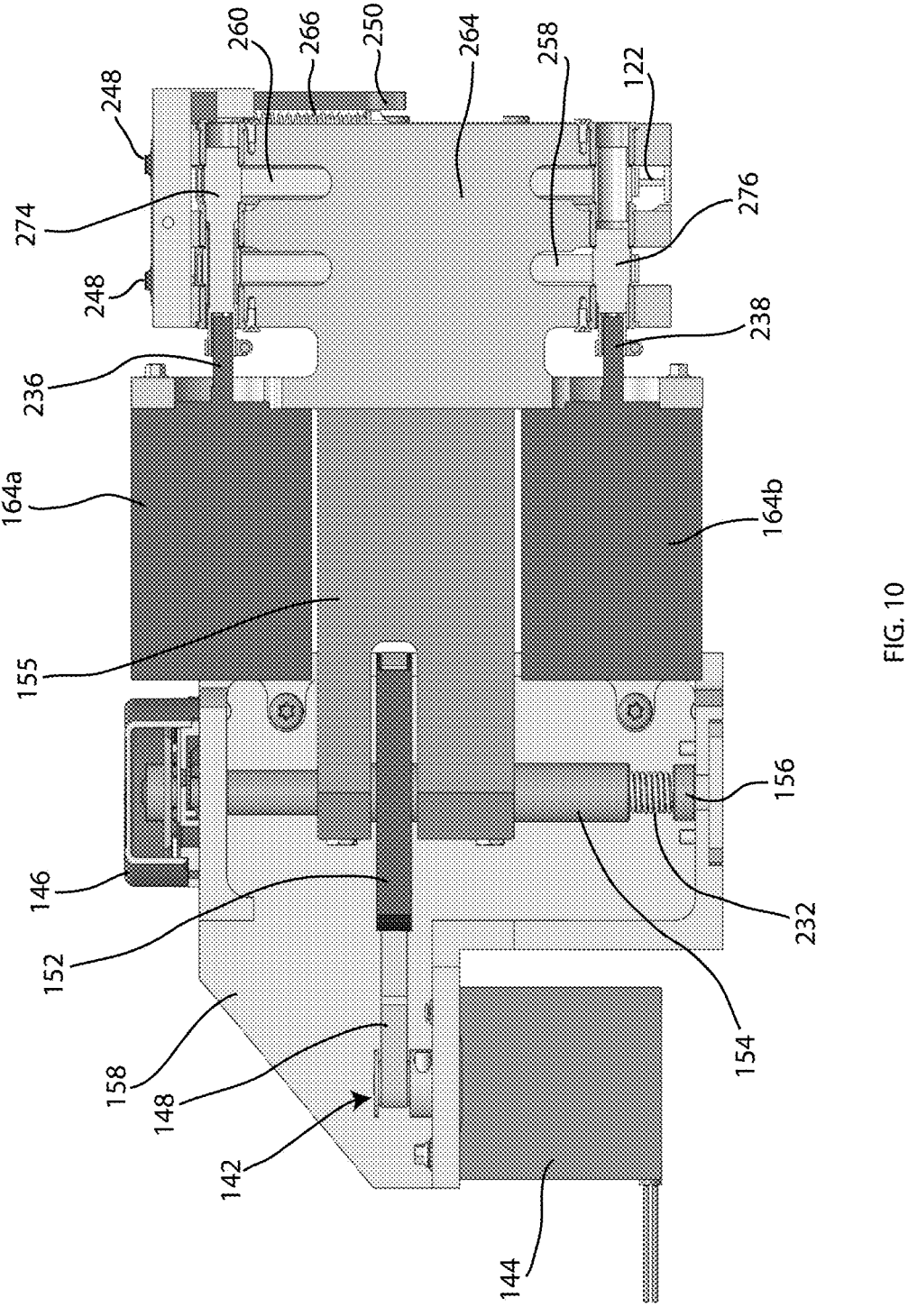
FIG. 10 depicts a side cross sectional view of the needle arm of FIGS. 6, 8 and 9, taken at arrows 10-10 in FIG. 9, in accordance with one embodiment.

FIG. 10 depicts a side cross sectional view of the needle arm 116, in accordance with one embodiment, taken at arrows 10-10 of FIG. 9. As shown, the drive system may include a system for converting the rotational motion of the drive shafts 236, 238 to vertical linear motion of the axis 258, 260. The first and second motors 164a, 164b may operate independently from each other such that the puncture needle 122 and the sample needle 261 are capable of independent vertical motion. The top drive shaft 236 is shown extending from the first motor 164a through an opening in the plate 192 of the housing 264. Similarly, the bottom drive shaft 238 is shown extending from the second motor 164b through an opening in the plate 192 of the housing 264. As shown, the top drive shaft 236 is attached to an engagement structure 274 that is configured to bypass the sample needle axis 258 and engage with the puncture needle axis 260 to convert rotational motion of the drive shaft 236 to linear vertical motion of the puncture needle axis 260. Similarly, the bottom drive shaft 238 is attached to an engagement structure 276 that is configured to engage with the sample needle axis 258 to convert rotational motion of the drive shaft 238 to linear vertical motion of the sample needle axis 258.

While the invention has been shown and described with reference to specific embodiments, it should be understood by those skilled in the art that various changes in form and detail may be made therein without departing from the spirit and scope of the invention as recited in the accompanying claims.

What is claimed is:

1. A liquid chromatography system comprising:
a solvent delivery system;
a sample manager having a thermal chamber, the thermal chamber including:
a sampling mechanism mounted within the thermal chamber, the sampling mechanism including;
a sample platter mounted therein, the sample platter configured to rotate about a first vertical axis, the sample platter including at least one carrier bay for receiving a sample vial carrier having an array of sample vials loaded therein;
a needle arm configured to rotate about a second vertical axis that is in a fixed position within the thermal chamber, wherein a combination of the rotation of the needle arm and the rotation of the sample platter provides complete coverage over an entirety of a working portion of the sample platter; and
a sample delivery system in fluidic communication with the solvent delivery system, the sample delivery system including a sample needle attached to the needle arm, the sample delivery system configured to transfer a first sample from a first sample vial carrier located in the sample platter into a chromatographic flow stream;
a liquid chromatography column located downstream from the solvent delivery system and the sample delivery system; and
a detector located downstream from the liquid chromatography column.

2. The liquid chromatography system of claim 1, wherein the needle arm includes a belt and pulley drive mechanism.

3. The liquid chromatography system of claim 1, wherein the needle arm includes a magnetic encoder configured to determine rotational position of the needle arm.

4. The liquid chromatography system of claim 1, wherein the sample delivery system includes a fluidic tube located between the sample needle and the liquid chromatography column, wherein the fluidic tube includes a coiled portion configured to expand and contract during rotation of the needle arm.

5. The liquid chromatography system of claim 1, wherein the sample platter is circular and wherein the at least one carrier bay includes a first bay, a second bay, a third bay and a fourth bay disposed equidistant about a perimeter of the circular sample platter.

6. The liquid chromatography system of claim 1, further comprising a control system, the control system configured to control the rotational movement of each of the sample platter and the needle arm, the control system configured to control a calibration process that includes the steps of:

moving the sample platter so that a first opening in the sample platter aligns with the sample needle on the needle arm;

moving the needle arm above the aligned first opening and recording a first encoder position of each of the sample platter and the needle arm;

moving the sample platter so that a second opening in the sample platter aligns with the sample needle on the needle arm;

moving the needle arm above the aligned second opening and recording a second encoder position of each of the sample platter and the needle arm; and with the known first and second encoder positions, back-calculating the geometric parameters of the sample platter and the needle arm to calibrate the movement of the sample platter and the needle arm.

7. A liquid chromatography sample manager comprising:

a thermal chamber;

a sample platter mounted in the thermal chamber, the sample platter configured to rotate about a first vertical axis, the sample platter including at least one carrier bay for receiving a sample vial carrier having an array of sample vials loaded therein;

a needle arm mounted within the thermal chamber, the needle arm configured to rotate about a second vertical axis that is in a fixed position within the thermal chamber, wherein a combination of the rotation of the needle arm and the rotation of the sample platter provides complete coverage over an entirety of a working portion of the sample platter; and a sample delivery system in fluidic communication with a solvent delivery system, the sample delivery system including a sample needle attached to the needle arm, the sample delivery system configured to transfer a first sample from a first sample vial carrier located in the sample platter into a chromatographic flow stream.

8. The liquid chromatography sample manager of claim 7, wherein the needle arm includes a belt and pulley drive mechanism.

9. The liquid chromatography sample manager of claim 7, wherein the needle arm includes a magnetic encoder configured to determine rotational position of the needle arm.

10. The liquid chromatography sample manager of claim 7, wherein the sample delivery system includes a fluidic tube located between the sample needle and a liquid chromatography column, wherein the fluidic tube includes a coiled portion configured to expand and contract during rotation of the needle arm.

11. The liquid chromatography sample manager of claim 7, wherein the sample platter is circular and wherein the at least one carrier bay includes a first bay, a second bay, a third bay and a fourth bay disposed equidistant about a perimeter of the circular sample platter.

12. The liquid chromatography sample manager of claim 7, further comprising a control system, the control system configured to control the rotational movement of each of the sample platter and the needle arm, the control system configured to control a calibration process that includes the steps of:

moving the sample platter so that a first opening in the sample platter aligns with the sample needle on the needle arm;

moving the needle arm above the aligned first opening and recording a first encoder position of each of the sample platter and the needle arm;

moving the sample platter so that a second opening in the sample platter aligns with the sample needle on the needle arm;

moving the needle arm above the aligned second opening and recording a second encoder position of each of the sample platter and the needle arm; and with the known first and second encoder positions, back-calculating the geometric parameters of the sample platter and the needle arm to calibrate the movement of the sample platter and the needle arm.

13. The liquid chromatography sample manager of claim 7, wherein the needle arm is configured to rotate about the second vertical axis at least 45 degrees and wherein the sample platter is configured to rotate about the first vertical axis 360 degrees.

14. A needle drive for a liquid chromatography system comprising:

a base including a shaft configured to rotate about a vertical axis, the base attachable to an interior of a sample manager of a liquid chromatography system such that the vertical axis remains in a fixed position; and a needle assembly attached to and extending from the base such that rotation of the shaft about the vertical axis rotates the needle assembly about the vertical axis, the needle assembly including a sample needle and a drive system including a sample needle motor configured to impart vertical movement of the sample needle, wherein the needle assembly is attachably removable from the base with a plurality of accessible coupling devices, wherein the sample needle motor is configured to rotate about the vertical axis with the needle assembly.

15. The needle drive of claim 14, wherein the needle assembly further includes a puncture needle, and wherein the needle assembly further includes a puncture needle motor configured to impart vertical movement on the puncture needle independently from the vertical movement of the sample needle, wherein the puncture needle motor is configured to rotate about the vertical axis with the needle assembly.

16. The needle drive of claim 14, wherein the needle assembly further includes a stripper foot movable in a vertical direction, wherein the stripper foot includes an opening through which the puncture needle is configured to extend during puncturing.

17. The needle drive of claim 16, further comprising a sensor system, the sensor system including a flexible circuit board attached to the base and configured to bend with the rotation of the shaft about the vertical axis.

18. The needle drive of claim 17, the sensor system further comprising a stripper foot movement sensor configured to determine that the stripper foot has been moved in a vertical direction a predetermined distance, a sample needle movement sensor configured to determine that the sample needle has been moved in a vertical direction to a sample needle home position, and a puncture needle movement sensor configured to determine that the puncture needle has been moved in a vertical direction to a puncture needle home position.

19. The needle drive of claim 14, further comprising a shaft motor configured to impart rotation on the shaft about the vertical axis, and further comprising a magnetic encoder configured to maintain precise rotational position of the shaft of the base.

20. A liquid chromatography system comprising:
  a solvent delivery system;
  a sample manager having a thermal chamber, the thermal chamber including:
  a sampling mechanism mounted within the thermal chamber, the sampling mechanism including;
  a sample platter mounted therein, the sample platter configured to rotate about a first vertical axis;
  a needle arm configured to rotate about a second vertical axis that is in a fixed position within the thermal chamber, wherein a combination of the rotation of the needle arm and the rotation of the sample platter provides complete coverage over an entirety of a working portion of the sample platter; and a sample delivery system in fluidic communication with the solvent delivery system, the sample delivery system including a sample needle attached to the needle arm, the sample delivery system configured to transfer a first sample from a first sample vial carrier located in the sample platter into a chromatographic flow stream;

a liquid chromatography column located downstream from the solvent delivery system and the sample delivery system; and a detector located downstream from the liquid chromatography column.

\* \* \* \* \*